United States Patent Office 2,953,607
Patented Sept. 20, 1960

---

2,953,607

PROCESS FOR THE PREPARATION OF TERTIARY ALKYL CYCLOPENTADIENES

Klaus Hafner, Marburg (Lahn), Germany, assignor to Studiengesellschaft Kohle m.b.H., Mulheim an der Ruhr, Germany No Drawing. Filed May 12, 1959, Ser. No. 812,598

Claims priority, application Germany May 20, 1958

4 Claims. (Cl. 260—666)

The invention relates to the production of tertiary alkyl cyclopentadienes. More particularly the invention relates to a novel process for the preparation of tertiary alkyl cyclopentadienes.

The following two methods are known for the introduction of substituents into the cyclopentadiene nucleus:

(1) The condensation of cyclopentadienes or indenes with ketones or aldehydes leads to fulvenes which may be partially hydrogenated with suitable reducing agents, e.g. Na—Al-amalgam or $LiAlH_4$, to the corresponding substituted cyclopentadienes or indenes; [J. Thiele u. A. Bühner, Liebigs Annalen d. Chemie, vol. 347, 249 (1906); J. Thiele u. H. Balhorn, Liebigs Annalen d. Chemie, vol. 348, 6 (1906); K. Ziegler, H. G. Gellert, H. Martin, K. Nagel u. J. Schneider, Liebigs Annalen d. Chemie, vol. 589, 91 (1954); K. Hafner, Liebigs Annalen d. Chemie, vol. 606, 79 (1957)];

(2) The reaction of alkali metal compounds of cyclopentadiene with alkyl halides leads likewise to substituted cyclopentadienes, the reaction of cyclopentadiene potassium and benzyl-chloride yielding for instance benzyl-cyclopentadiene [K. Alder and H. Holzrichter, Liebigs Annalen d. Chemie, vol. 524, 145 (1936)].

A disadvantage of the first procedure lies in the fact that the condensation of cyclopentadiene with aliphatic aldehydes does not yield the corresponding fulvenes, or only to a very low degree, and that the reduction of the fulvenes necessitates very often the use of the expensive $LiAlH_4$. Therefore the second procedure is usually preferred, especially as in recent time the cyclopentadiene sodium became available in a particularly simple manner (German patent specifications 924,029 and 927,873, German patent application Z 4713 IVc/12o). The preparation of substituted cyclopentadienes from cyclopentadiene metal compounds and alkyl halides corresponds to the alkylation of other organic compounds containing an active methylene group such as malonic ester, acetoacetic ester, 1,3-diketones and other compounds by reacting their alkali metal salts with alkyl halides.

While primary and in some cases even secondary alkyl halides react in good yields with the sodium salts of compounds containing an active methylene group yielding the corresponding alkyl derivatives, this procedure does not permit the introduction of tertiary alkyl residues into compounds containing activated methylene groups, or only with very poor yields, so far as is known until now.

Concerning the action of tertiary alkyl halides on compounds with active methylene groups the following experiences were gained until now. E. R. Alexander, J. D. McCollum and D. E. Paul [Am. Chem. Soc., vol. 72, 4791 (1950)] reported that the alkylation method can be used in preparing substituted acetoacetic esters, malonic esters or cyano acetic esters only for the purpose of introducing primary or secondary alkyl groups, whereas the tertiary alkyl halides split off hydrogen halide very easily under the alkaline conditions which exist during the reaction with the formation of alkenes. Similar observations have been reported by other authors. A. C. Cope et al. for instance reported in Organic Reactions, vol. IX, page 139, that alkyl halides which easily split off hydrogen halide such as tertiary alkyl halides are unsuitable alkylating agents the yields of the alkylated products being very poor due to the occurring losses of the alkyl halide and the base. In accordance herewith E. u. O. Grydziewicz-Trochimowski (Bulletin de la Société Chimique de France, 1951, 269) obtained only 7 percent of the theoretical yield of tertiary butyl malonic ester when reacting tertiary butyl bromide with sodium malonic ester. It has also been reported (Organic Reactions, vol V, pages 25 and 30) that the reaction of tertiary alkyl halides with sodium acetylene did not lead to the desired tertiary alkyl acetylenes. Numerous other examples with similar results have been reported in the literature.

It has now been found that the tertiary alkyl cyclopentadienes are produced with good yields by the method which comprises reacting a metal compound of a compound selected from the group consisting of cyclopentadiene, its alkyl, aralkyl and aryl substituted derivatives and indene with a tertiary alkyl halide and separating the resulting tertiary alkyl cyclopentadiene. The yields of the tertiary alkyl cyclopentadienes are about 50 to 80 percent of the theoretical. This result is surprising and stands in contrast to the experiences which so far were gained with regard to the reaction of tertiary alkyl halides with metal compounds of other comparable products such as acetoacetic, cyanoacetic or malonic esters. It is surprising that the cyclopentadiene compounds react in this respect differently from other comparable compounds.

The process of the present invention can be carried out in a simple way. According to a preferred embodiment of the present invention the method of producing tertiary alkyl cyclopentadienes comprises reacting a metal compound of a compound selected from the group consisting of cyclopentadiene, its alkyl, aralkyl and aryl substituted derivatives and indene with a tertiary alkyl halide in an inert organic solvent wherein the metal compound is at least partially soluble, and separating the resulting tertiary alkyl cyclopentadiene.

The cyclopentadiene metal compound may be dissolved or suspended in a suitable inert solvent and an equivalent amount of the tertiary alkyl halide added to the solution, the mixture being then heated to a temperature between 50 and 100° C. and subsequently worked up. The metal halide which is formed by the reaction may be separated by filtration or centrifuging; the reaction mixture may be subjected to fractional distillation in vacuo. It is also possible to distil off the solvent directly from the reaction mixture using a small distillation column, and then to subject the residue to fractional distillation in vacuo. This process yields the tertiary alkyl cyclopentadiene in pure state.

As cyclopentadiene metal compounds are preferably used the alkali and alkaline earth metal compounds of cyclopentadiene, alkyl, aralkyl or aryl cyclopentadienes as well as of indene. Particularly advantageous are the sodium compounds. It is also possible, however, to use for example the calcium compounds or other alkaline-earth metal compounds.

As solvents or dispersing agents for the cyclopentadiene metal compounds are used for instance inert organic solvents which have a boiling point above 50° C. and wherein the used cyclopentadiene metal compounds are at least partially soluble. The reaction proceeds particularly easy in homogeneous phase. As solvents for the cyclopentadiene sodium are suitable for instance tetrahydrofuran, tetrahydropyran and glycol-dimethyl-ether or mixtures of these compounds with other inert organic solvents such as benzene or decalin.

As tertiary alkyl halides the tertiary alkyl chlorides, bromides and iodides may be used. The bromides are preferred. It is understood that the term tertiary alkyl halide within the scope of the present invention comprises also such tertiary alkyl halides which are substituted by groups which are indifferent with respect to the employed cyclopentadiene metal compounds. Furthermore such alkyl halides are to be comprised wherein two alkyl chains are forming a ring.

The tertiary alkyl cyclopentadienes obtainable according to the present invention represent in most cases colourless liquids with a terpene like odour. At elevated temperatures they form dimerics comparatively easily. The tertiary alkyl cyclopentadienes are easily accessible intermediate materials for the preparation of cyclopentadiene metal complex compounds of the ferrocen type and of tertiary alkyl azulenes. They may also be employed as diene components in the diene synthesis as well as for other purposes such as perfumes etc.

Example 1

162 ccm. (0.5 mole) of a 3.08 molar sodium cyclopentadiene solution in tetrahydrofuran are added dropwise to a solution of 68.5 g. (0.5 mole) of tertiary butyl bromide in 50 ccm. of absolute tetrahydrofuran while stirring and with exclusion of air. The mixture is heated to the boiling point for 2 hours. The sodium bromide separates slowly from the reaction solution. Then the tetrahydrofuran is distilled off using a small Vigreux-column, and the residue is subjected to distillation in vacuo at 31 Torr. The tertiary butyl cyclopentadiene represents a colourless oil and distils at 43 to 46° C.

Yield: 40 g. of tertiary butyl cyclopentadiene (65 percent of the theoretical).

$n_D^{20}$: 1.4582.

Molecular weight: found, 124; calculated, 122.1.

Analysis: $C_9H_{14}$ (122.1).

Calculated: C, 88.45; H, 11.55.

Found: C, 88.09; H, 11.30.

Example 2

39 ccm. (0.103 mole+5 percent) of a 2.48 molar solution of sodium cyclopentadiene in tetrahydrofuran are added slowly to a solution of 15.5 g. (0.103 mole) of tertiary amyl bromide in 10 ccm. of absolute decalin while stirring and with exclusion of air. After sucking off the precipitated sodium bromide the reaction mixture is liberated from the tetrahydrofuran and the residue is distilled using a Vigreux-column under water jet vacuum. The tertiary amyl cyclopentadiene distils at 50° C. and 14 Torr. as a colourless liquid.

Yield: 10.5 g. of tertiary amyl cyclopentadiene (77 percent of the theoretical).

$n_D^{18}$: 1.4644.

Molecular weight: found, 135, calculated, 136.23.

Analysis: $C_{10}H_{16}$ (136.23).

Calculated: C, 88.16; H, 11.84.

Found: C, 88.31; H, 11.56.

Example 3

71 g. (0.43 mole) of 2-bromo-2-methylpentane, dissolved in 50 ccm. of absolute benzene are added to 163 ccm. of a 2.48 molar solution of cyclopentadiene sodium in tetrahydrofuran (0.42 mole+5 percent). The reaction mixture is boiled for 2 hours while stirring and with exclusion of air. Then the precipitated sodium bromide is sucked off and the tetrahydrofuran and benzene is distilled off using a Vigreux-column. The residue is then subjected to fractional distillation under water jet vacuum. The 2-methylpentyl-2-cyclopentadiene distils as a colourless oil and has a boiling point of 66° C. at 14 Torr.

Yield: 48.5 g. 2-methylpentyl-2-cyclopentadiene (75 percent of the theoretical).

$n_D^{18}$: 1.4654.

Molecular weight: found, 151; calculated, 150.25.

Analysis: $C_{11}H_{18}$ (150.25).

Calculated: C, 87.92; H, 12.08.

Found: C, 87.68; H, 11.85.

What I claim is:

1. A method of producing tertiary alkyl cyclopentadienes which comprises reacting a compound selected from the group consisting of the alkali and the alkaline earth metal compounds of cyclopentadiene, its alkyl, aralkyl and aryl substituted derivatives and indene with a tertiary alkyl halide and separating the resulting tertiary alkyl cyclopentadiene.

2. A method of producing tertiary alkyl cyclopentadienes which comprises reacting a compound selected from the group consisting of the alkali and the alkaline earth metal compounds of cyclopentadiene, its alkyl, aralkyl and aryl substituted derivatives and indene with a tertiary alkyl halide in an inert organic solvent wherein the metal compound is at least partially soluble, and separating the resulting tertiary alkyl cyclopentadiene.

3. A method of producing tertiary alkyl cyclopentadienes which comprises reacting an alkali metal compound of cyclopentadiene with a tertiary alkyl halide and separating the resulting tertiary alkyl cyclopentadiene.

4. A method of producing tertiary alkyl cyclopentadienes which comprises reacting an alkali metal compound of cyclopentadiene with a tertiary alkyl halide in an inert organic solvent wherein the metal compound is at least partially soluble, and separating the resulting tertiary alkyl cyclopentadiene.

References Cited in the file of this patent

UNITED STATES PATENTS

| 2,763,700 | Hobbs | Sept. 18, 1956 |
| 2,773,092 | Carley et al. | Dec. 4, 1956 |
| 2,852,568 | Schwerling | Sept. 16, 1958 |

OTHER REFERENCES

Alder et al.: Liebigs Annalen d. Chemie, volume 524, 1936, page 145.